United States Patent [19]

Vanaschen et al.

[11] Patent Number: 5,045,102
[45] Date of Patent: Sep. 3, 1991

[54] BLOW BOX FOR HEAT TEMPERING GLASS SHEETS IN HORIZONTAL POSITION

[75] Inventors: Luc Vanaschen, Eupen, Belgium; Hans-Werner Kuster, Aachen; Werner Diederen, Herzogenrath, both of Fed. Rep. of Germany

[73] Assignee: Saint Gobain Vitrage International, Courbevoie, France

[21] Appl. No.: 556,436

[22] Filed: Jul. 24, 1990

[30] Foreign Application Priority Data

Jul. 24, 1989 [DE] Fed. Rep. of Germany ....... 3924402

[51] Int. Cl.$^5$ ............................................. C03B 27/00
[52] U.S. Cl. .......................................... 65/165; 65/27; 65/288; 65/351; 209/675; 209/924
[58] Field of Search .................. 209/675, 924; 65/348, 65/349, 351, 19, 2, 288, 27, 165

[56] References Cited

U.S. PATENT DOCUMENTS

| | | | |
|---|---|---|---|
| 1,680,361 | 8/1928 | Beach | 65/165 |
| 2,875,895 | 3/1957 | Traylor | 209/924 X |
| 4,076,511 | 2/1978 | Fulton | 65/27 |
| 4,179,275 | 12/1979 | Metz et al. | 65/19 X |
| 4,233,048 | 11/1980 | Gintert | 65/27 |
| 4,305,743 | 12/1981 | Hummell | 65/19 X |
| 4,501,603 | 2/1985 | Frank et al. | 65/104 X |
| 4,883,527 | 11/1989 | McMaster et al. | 65/351 X |

Primary Examiner—Robert L. Lindsay
Attorney, Agent, or Firm—Oblon, Spivak, McClelland, Maier & Neustadt

[57] ABSTRACT

A lower blow box of a device for heat tempering glass sheets in horizontal position exhibits a series of nozzle plates which are placed at a distance (A) from one another. Between nozzle plates there are obliquely placed sheet-metal chutes, U-shaped in cross section, which laterally convey out the broken glass pieces arising in the breaking of the glass sheet during tempering. The sheet-metal chutes are vibrated with a vibrator.

10 Claims, 2 Drawing Sheets

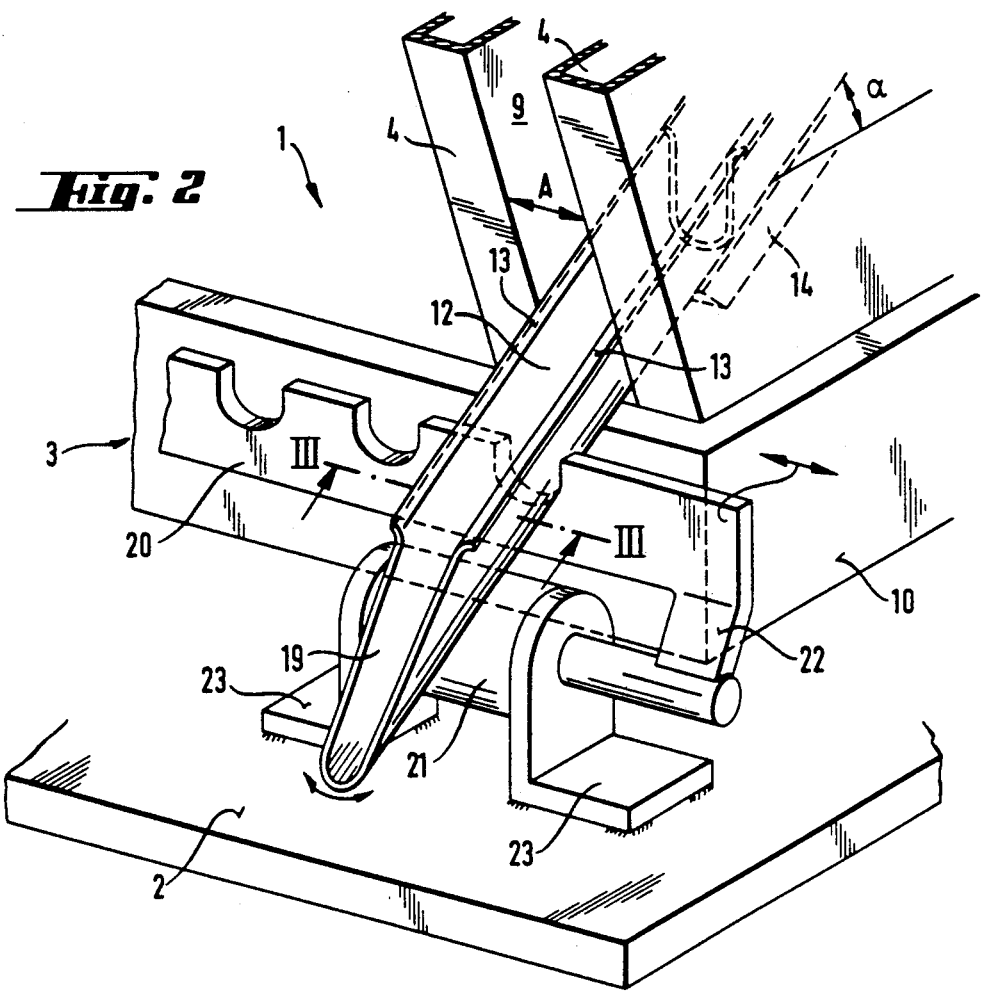
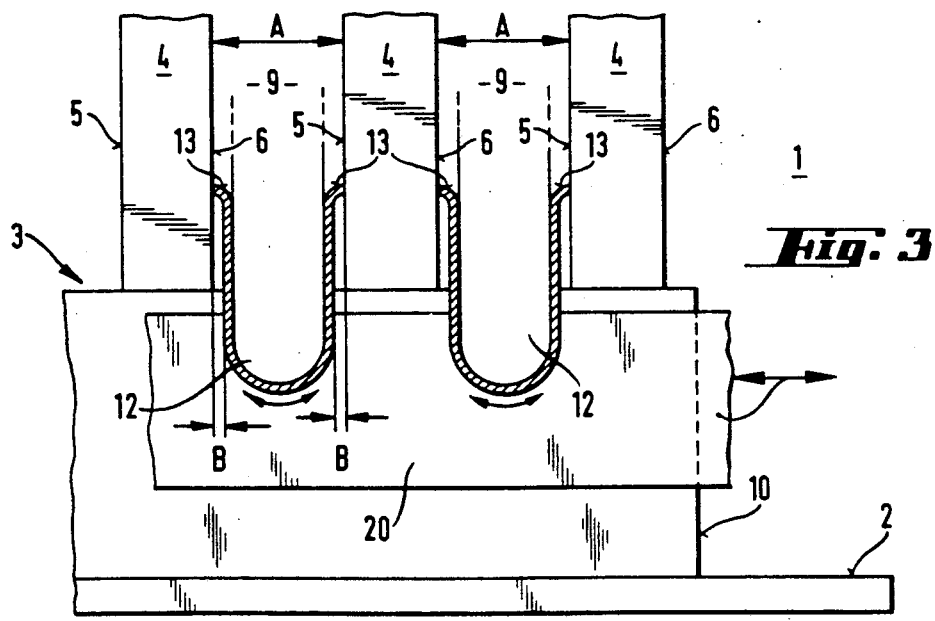

BLOW BOX FOR HEAT TEMPERING GLASS SHEETS IN HORIZONTAL POSITION

BACKGROUND OF THE INVENTION

1. Field of the Invention

The invention relates to a device for heat tempering glass sheets in horizontal position, with two blow boxes placed opposite one another, of which the lower blow box exhibits a series of nozzle plates, placed at a distance from one another, between which there are provided obliquely placed slides, on which the broken glass pieces arising in the breaking of the glass sheet during tempering slide laterally out of the blow box.

2. Description of the Related Art

A device of this type is described, for example, in DE-36 12 720 A1. In this conventional device, the slopes, placed in a roof-shaped manner, are formed from shaped strips, which are rigidly placed between the nozzle plates.

The strips, placed in a roof-shaped manner, settle the broken glass pieces in the spaces between the nozzle strips. The broken glass pieces generally have an angular configuration with plane surfaces, as a result of which their mutual mobility is relatively slight. The broken pieces are smaller than the space between the nozzle plates, but several broken pieces can easily come to rest next to each other and wedge, which leads to difficulties with respect to their mobility. If the broken glass pieces are jammed tight in a space between two nozzle plates, in the course of time this space becomes clogged. The result is that the blast air after striking the glass sheet at this point can no longer flow off sufficiently. As a result an air current is formed, which leads to a defective, i.e., an unsatisfactory tempering in the corresponding area of the glass sheet.

SUMMARY OF THE INVENTION

The object of the invention is to provide a novel blow box of the type which reliably avoids the danger of an accumulation of broken glass pieces in a space between two nozzle plates.

This object is achieved according to the invention in that obliquely placed slides between the nozzle plates can be vibrated.

In conventional blow boxes with permanently installed slides for the broken glass pieces, the strips forming the slides are placed at a relatively steep installation angle. The shaped strips according to the present invention which are able to be vibrated, can be installed at a substantially smaller angle, without the reliable removal of the broken glass pieces being thereby adversely affected. For this reason and because of the possibility of guiding the shaped strips, able to vibrated, up to a little under the upper closing strips of the nozzle plates, the overall height of the blow box altogether can be substantially reduced.

Basically, the slopes are formed by shaped strips, which preferably are put into vibration in their longitudinal direction or in their crosswise direction. It is especially advantageous if the shaped strips are designed as U-shaped sheet-metal chutes.

The chutes suitably project laterally from the blow box and, on their projecting end, are connected to a suitable vibrator.

Accordingly, the present invention relates to a device for heat tempering glass sheets in horizontal position, comprising: two blow boxes positioned opposite one another in upper and lower positions, the lower blow box comprises a series of nozzle plates, each of the nozzle plates being positioned at a distance from one another to create a space between each of the nozzle plates; slides obliquely positioned in the space between the nozzle plates, wherein broken glass which occurs due to breaking of the glass sheets during tempering slide laterally out of the lower blow box on the slides; and means for vibrating the slides between the nozzle plates.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows a detail from FIG. 1 in enlarged representation; and

FIG. 3 shows a vertical section in plane III—III of FIG. 2.

DESCRIPTION OF THE PREFERRED EMBODIMENT

Figure 1:
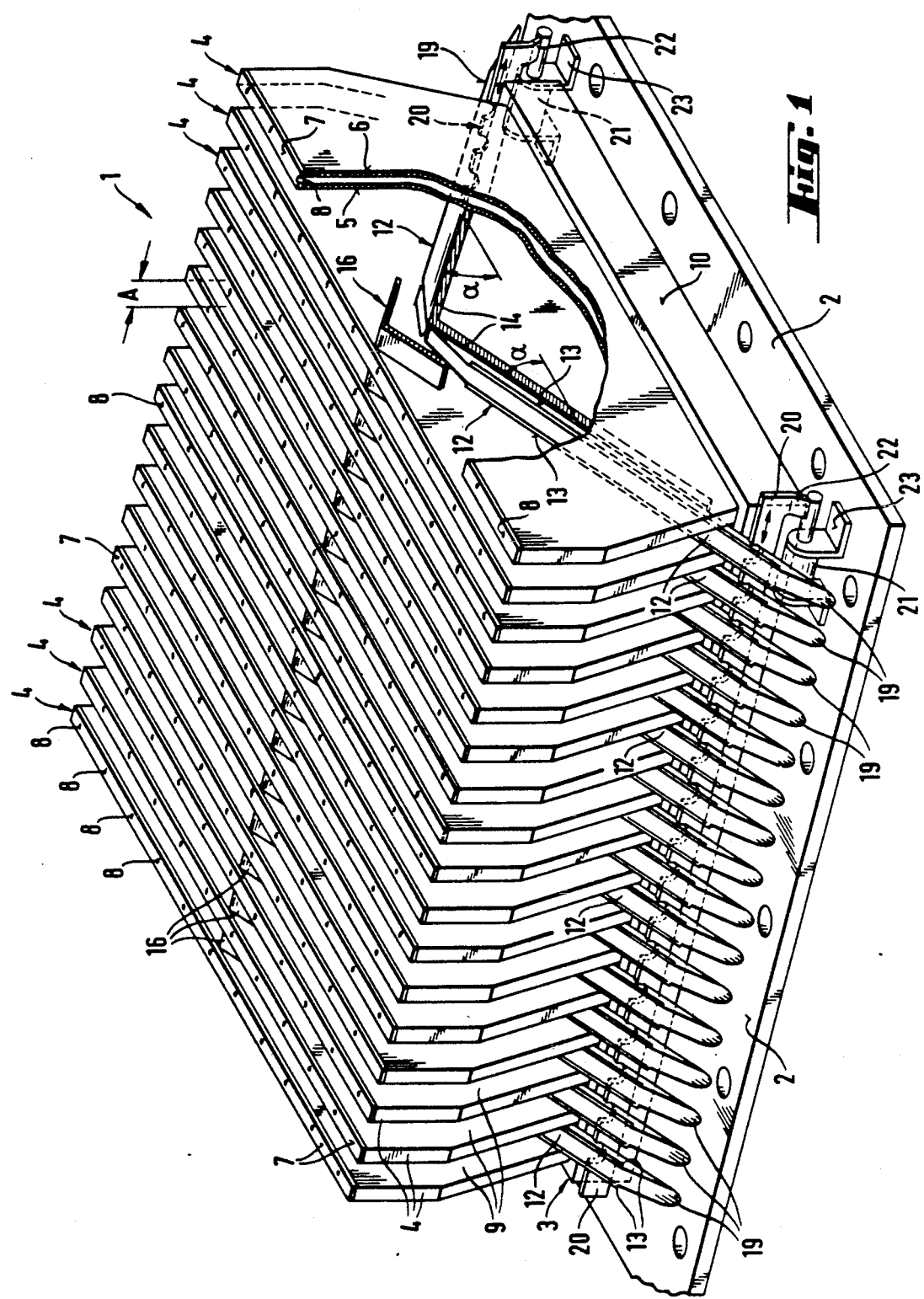
FIG. 1 shows a blow box according to the invention in a perspective representation.

Blow box 1 represented in FIG. 1 is the lower blow box of a tempering device for glass sheets in horizontal position. In mirror image to blow box 1 a same or similarly designed blow box is placed above it, which for better overall view is not shown here. The upper blow box obviously does not need to exhibit any devices for removal of broken glass pieces since the broken glass pieces can settle only in the lower blow box.

Blow box 1 is provided on its lower end with an annular flange 2, by which it is connected with a corresponding annular flange on the end of the air feed system. Blow box 1 comprises an air distributor box 3 and, going out from it, nozzle plates 4, which are placed at distance A from one another. Nozzle plates 4 are formed by side walls 5, 6, which consist of metal plate or sheet metal. Strips 7 for closing the nozzle plates are provided above the nozzle plates 4. Bores 8 which form blowholes are provided in the strips 7. The blast air, heated by striking the hot glass sheet, flows through spaces 9 between nozzle plates 4.

In each of spaces 9 two sheet-metal chutes 12, designed U-shaped in cross section, are each placed at an angle of inclination alpha to the horizontal. As can be seen in, for example, FIG. 3, upper end area 13 of the two sides of sheet-metal chute 12 each is bent outward by a small measurement B and rest against the corresponding side wall of nozzle plates 4. In this way there remains between the sides of sheet-metal chute 12 and the respective wall of nozzle plate 4 a corresponding distance B, which allows a lateral movement of the conveyor area of sheet-metal chute 12, while at the same time end area 13 of sheet-metal chute 12 remain in close contact with the walls of nozzle plates 4.

Sheet-metal chutes 12 are mounted on strips 14. In the upper area, the two sheet-metal chutes 10 end at a slight distance from one another and, for example, are sloped at a slight incline. Above the point, where the two sheet-metal chutes 12 meet, there is placed an angular deflection plate 16 between nozzle plates 4, whose task is to guide the glass splinters falling down at this point into the one or the other sheet-metal chute 12 and to prevent glass splinters from settling between the end areas of the two sheet-metal chutes 12.

Lower end section 19 of each sheet-metal chute 12 projects by a certain measurement, which is governed by the respective design conditions, laterally from the blow box, to guide the broken glass pieces away to a desired point.

As can be seen in FIG. 2, lower end section 19 of each sheet-metal chute 12 is mounted in a recess of a comb-like carrier strip 20. All sheet-metal chutes 12, placed on one side of the blow box, are connected to a vibrator 21 by this carrier strip 20. The housing of vibrator 21 is fastened by flanges 23 to annular flange 2 or to frame 10 of the blow box. The vibrations produced by vibrator 21 are transmitted by connecting piece 22 to carrier strip 20.

In the case of the vibrator a pneumatic or an electric vibration generator can be involved. The travel of the vibrator and the vibration frequency can vary in relatively wide limits. For example, the travel can be 0.5 to 5 mm, and the frequency 10 to 200 vibrations per second. Good results are achieved if the vibration frequency is 50 per second and the travel 2 mm.

Sheet-metal chutes 12, especially have a rounded cross section, by which the sliding movement of the broken glass pieces along sheet-metal chutes 12 is promoted and a mutual wedging or clogging of the broken glass pieces is avoided.

Obviously, numerous modification and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Device for heat tempering glass sheets in horizontal positions comprising:

two blow boxes positioned opposite one another in upper and lower positions, said lower blow box comprising a series of nozzle plates, each of said nozzle plates being positioned at a distance from one another to create a space between each of said nozzle plates;

slides obliquely positioned in said space between said nozzle plates, wherein broken glass which occurs due to breaking of the glass sheets during tempering slide laterally out of said lower blow box on said slides; and means for vibrating said slides between said nozzle plates.

2. Device according to claim 1, wherein said slides are formed from sheet-metal chutes which are U-shaped in cross section.

3. Device according to claim 1 or 2, wherein the sheet-metal chutes exit laterally from the lower blow box.

4. Device according to claim 3, wherein end sections of the sheet-metal chutes project from the lower blow box and are connected to a vibrator.

5. Device according to claim 4, wherein end areas of the two sides of the U-shaped sheet-metal chutes are each bent outward, wherein a width dimension of the sheet-metal chutes under the bent end areas is smaller than the distance between two of said nozzle plates.

6. Device according to claim 5, wherein all of said slides positioned between the nozzle plates and said U-shaped sheet metal chutes are connected by a common carrier strip to said vibrating means.

7. Device according to claim 6, wherein pairs of said slides are each positioned in a roof-shaped manner toward one another, in each of said spaces between said two nozzle plates.

8. Device according to claim 7, wherein an angular deflection plate for the broken glass pieces is placed between said nozzle plates above a point at which said pair of slides meet.

9. Device according to claim 8, wherein said vibrating means is a pneumatic vibration generator.

10. Device according to claim 8, wherein said vibrating means is an electric vibration generator.

* * * * *